United States Patent [19]

Etoh

[11] Patent Number: 4,908,764
[45] Date of Patent: Mar. 13, 1990

[54] SYSTEM AND METHOD FOR AUTOMATICALLY CONTROLLING A VEHICLE SPEED TO A DESIRED CRUISING SPEED

[75] Inventor: Yoshiyuki Etoh, Kanagawa, Japan

[73] Assignee: Nissan Motor Company, Ltd., Japan

[21] Appl. No.: 146,558

[22] Filed: Jan. 21, 1988

[30] Foreign Application Priority Data

Jan. 23, 1987 [JP] Japan .............................. 62-7565[U]

[51] Int. Cl.⁴ ............................................... B60K 31/04
[52] U.S. Cl. ................................ 364/426.04; 180/179; 123/352
[58] Field of Search ...................... 364/426.04, 431.07; 123/352; 180/170, 176, 179

[56] References Cited

U.S. PATENT DOCUMENTS

| | | | |
|---|---|---|---|
| 4,374,422 | 2/1983 | O'Keefe, Jr. et al. | 123/352 |
| 4,419,729 | 12/1983 | Krieder | 123/352 |
| 4,707,792 | 11/1987 | Naitou | 123/352 |
| 4,756,378 | 7/1988 | Takei | 180/179 |
| 4,829,437 | 4/1987 | Suzuki et al. | 364/426.04 |
| 4,829,438 | 6/1987 | Etoh | 364/426.04 |
| 4,835,696 | 5/1987 | Suzuki et al. | 364/426.04 |

FOREIGN PATENT DOCUMENTS 47-35692 11/1972 Japan .

Primary Examiner—Gary Chin
Attorney, Agent, or Firm—Lowe, Price, LeBlanc, Becker & Shur

[57] ABSTRACT

A system and method for automatically controlling a vehicle speed to a desired cruising speed applicable to vehicles in which a basic manipulated variable corresponding, for instance, to an operation time of either of acceleration or deceleration valve in an actuator for actuating an engine throttle valve of a vehicle in which the system is mounted toward the acceleration or deceleration direction which is derived on the basis of the vehicle speed and target cruising speed so that the vehicle speed coincides with the desired target cruising speed is corrected according to a transfer function of a response to the opening angle of the throttle valve to the manipulated variable. The response of the throttle valve to a change in the manipulated variable is measured and the transfer function is computed on the basis of the measured response to compensate for vehicle variations and aging effects.

8 Claims, 5 Drawing Sheets

SYSTEM AND METHOD FOR AUTOMATICALLY CONTROLLING A VEHICLE SPEED TO A DESIRED CRUISING SPEED

BACKGROUND OF THE INVENTION (1) Field of the Invention

The present invention relates to an improved system and method for automatically controlling a vehicle speed to a desired cruising speed.

(2) Background of the art

A Japanese Patent Application First Publication (Kokai) sho 47-35692 published on Nov. 25, 1972 exemplifies one of such automatic cruising speed controlling systems.

In the above-identified Japanese Patent Application Publication, target vehicle speed setting means is provided for setting a target vehicle speed according to a vehicle driver's intention and vehicle speed detecting means is provided for measuring the vehicle speed. In addition, controlling means is provided for calculating an integral error $\epsilon_I (= Vs-V)$ of the detected vehicle speed V with respect to the above-described target vehicle speed Vs and proportional error $\epsilon_p (=V'-V)$ between the present vehicle speed V and vehicle speed V' before one control period for a predetermined period (e.g., 300msec.) and calculating a valve opening duration $t_p (=K_I \times \epsilon_I + K_p \times \epsilon_p)$ by adding these errors $\epsilon_I$, $\epsilon_p$ which are multiplied by gain constants $K_I$ and $K_p$ corresponding to these errors, respectively. An acceleration valve for driving an engine throttle valve to open is operated for the duration calculated as $t_p$, if the value of $t_p$ is positive. When the value of $t_p$ indicates negative, a deceleration valve for driving the engine throttle valve to close is operated for the duration calculated as $t_p$. Consequently, the values $\epsilon_I$ and $\epsilon_p$ are controlled to approach zero so that the vehicle speed V matches the target vehicle speed Vs.

A throttle actuator for driving the throttle valve according to each open duration of such acceleration and deceleration valves includes a pneumatic diaphragm, one end of which is connected via an accelerator link to the engine throttle valve and receives an actuating force due to pressure difference between internal air pressure and atmospheric pressure which occurs due to the opening and closing operations of the acceleration and deceleration valves. The accelerator link is linked to the throttle valve via an accelerator wire. Thus, an opening angle of the throttle valve is controlled through the valve open duration $t_p$ described above. Consequently, an engine output torque $T_E$ according to the opening angle of the throttle valve is generated and converted into a vehicle driving torque $T_p$ through a transmission and tires in a power train. Then, the vehicle runs at the vehicle speed V due to the driving torque $T_p$.

However, in the above-described automatic cruising speed controlling system a manipulated variable (valve opening duration) is calculated and outputted using the unique and same control equation ($t_p = K_I \times \epsilon_I + K_p \times \epsilon_p$) although a transfer function of the throttle actuator and accelerator link is largely dependent upon a variation of frictional forces at the time when the accelerator link for every vehicle strokes, a variation of responsive characteristic for every actuator, temperature change and aging effects, it o is difficult to maintain a cruising speed controlling characteristic constant at all times and for each vehicle. In addition, vehicle occupants receive shocks due to the acceleration and deceleration of the vehicle and feel uncomfortable.

SUMMARY OF THE INVENTION

It is therefore an object of the present invention to provide a system and method for automatically controlling a vehicle speed to a desired vehicle cruising speed in which a constant cruising speed controlling characteristic is always maintained even when vehicles on which the systems are mounted are mutually different.

The above-described object can be achieved by providing a system for automatically controlling a vehicle speed to a desired cruising speed, comprising: (a) first means for measuring the vehicle speed; (b) second means for setting the vehicle speed to the desired target cruising speed according to a driver's intention; (c) third means for controlling an engine input variable having a corelationship to an engine output of a vehicle in which the system is mounted on the basis of a manipulated variable so that the vehicle speed coincides with the target cruising speed; (d) fourth means for calculating a basic manipulated variable on the basis of the measured vehicle speed and the set target cruising speed; (e) fifth means for measuring the input variable of the engine input; (f) sixth means for calculating a transfer function of a response of the engine input variable to the manipulated variable detected by the fifth means; and (g) seventh means for correcting the basic manipulated variable on the basis of the transfer function calculated by the sixth means and setting the manipulated variable according to the corrected manipulated variable.

The above-described object can also be o achieved by providing a system for automatically controlling a vehicle speed to a desired cruising speed. comprising: (a) first means for detecting the vehicle speed; (b) second means for setting the vehicle speed to a target cruising speed according to a driver's intention; (c) third means for controlling an opening angle of an engine throttle valve of a vehicle in which the system is mounted on the basis of a manipulated variable so that the vehicle speed coincides with the target cruising speed; (d) fourth means for calculating a basic manipulated variable on the basis of the detected vehicle speed and set cruising speed; (e) fifth means for measuring the opening angle of the throttle valve; (f) sixth means for calculating a transfer function of a response of the opening angle of the engine throttle valve measured by the fifth means to the manipulated variable; and (g) seventh means for correcting the basic manipulated variable on the basis of the transfer function measured by the sixth means and setting and outputting the manipulated variable to the third means according to the corrected manipulated variable.

The above-described object can be achieved by providing a method for automatically controlling a vehicle speed to a desired cruising speed, comprising the steps of: (a) measuring the vehicle speed; (b) setting the vehicle speed to the desired target cruising 20 speed according to a driver's intention; (c) calculating a basic manipulated variable on the basis of the detected vehicle speed and set cruising speed; (d) measuring an opening angle of an engine throttle valve of a vehicle; (e) calculating a transfer function of a response of the detected opening angle of the throttle valve to the manipulated variable; (f) correcting the basic manipulated variable on the basis of the transfer function measured in the step (e) setting and outputting the corrected manipulated variable and (g) controlling the opening angle of the throttle valve on the basis of the corrected manipulated variable so that the vehicle speed coincides with the target cruising speed.

DETAILED DESCRIPTION OF THE PREFERRED EMBODIMENT

Reference will hereinafter be made to the drawings in order to facilitate understanding of the present invention.

Figure 1:
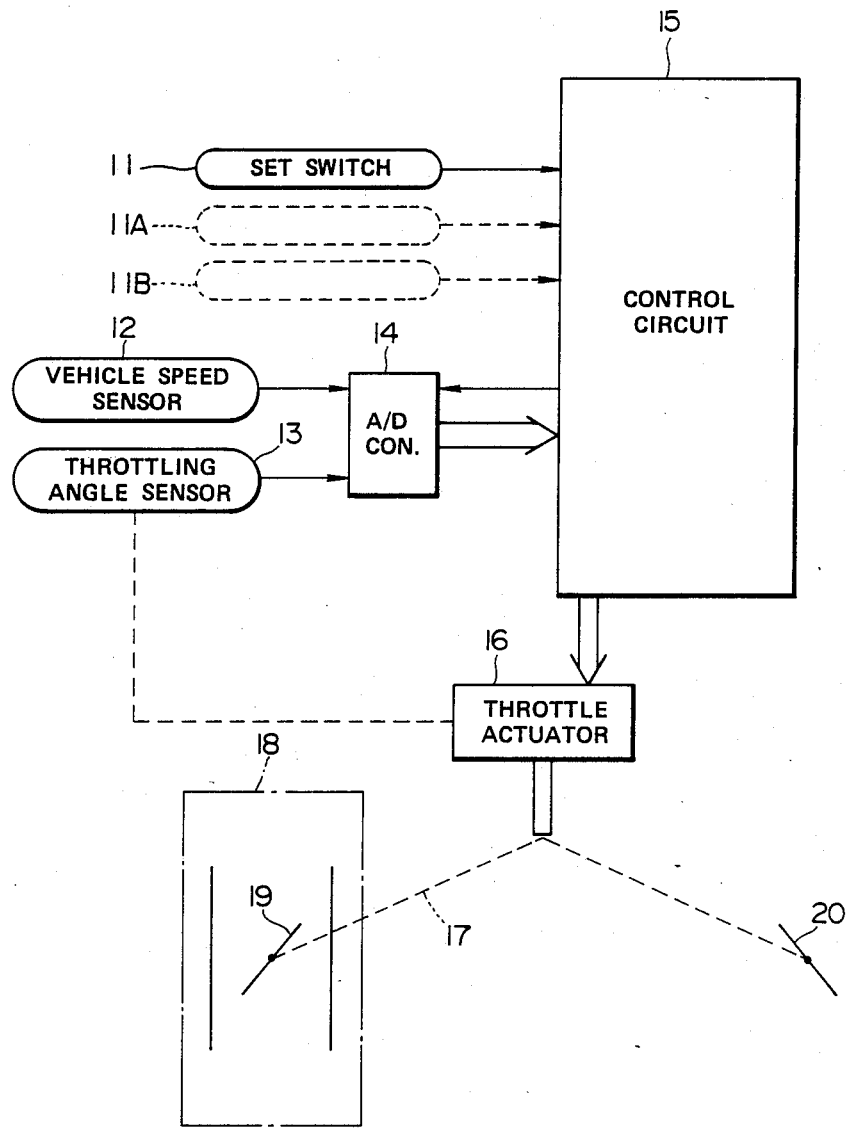
FIG. 1 is a circuit block diagram of a system for automatically controlling a vehicle speed to a desired vehicle speed according to the present invention.

FIG. 1 shows a hardware construction of a preferred embodiment of a system for automatically controlling a vehicle speed to a desired cruising speed according to the present invention.

In FIG. 1, a set switch 11 is connected to a control circuit 15 for setting the instantaneous vehicle speed as a target vehicle speed when an operator turns on the set switch A vehicle speed sensor 12 is connected to the control circuit 15 via an analog-to-digital (A/D CON) converter 14 for measuring a vehicle speed. A throttle sensor 13 is also connected to the control circuit 15 via the A/D CON. 14 which produces a voltage proportional to an opening angle of the throttle valve 19.

The control circuit comprises a microcomputer having a ROM (Read Only Memory). RAM (Random Access Memory), CPU (Central Processing Unit). and I/O (Output/Input) Port. The control circuit 15 receives each digital and on signal from the set switch 11, vehicle speed sensor 12, and throttle sensor 13 and outputs an operating signal corresponding to a manipulated variable of the throttle valve 19 so that the actual vehicle speed approaches the target vehicle speed on the basis of each input signal described above.

Furthermore, a throttle actuator 16 is provided for opening and closing the throttle valve 19 within a throttle chamber 18 of a vehicular engine via an accelerator link 17 in response to the operating signal from the control circuit 15. It is noted that one end of the accelerator link is linked to an accelerator pedal 20 of the vehicle so that the opening angle of the throttle valve 19 is controlled in response to a depression operation of the accelerator pedal except when the automatic cruising speed control is carried out.

Figure 2:
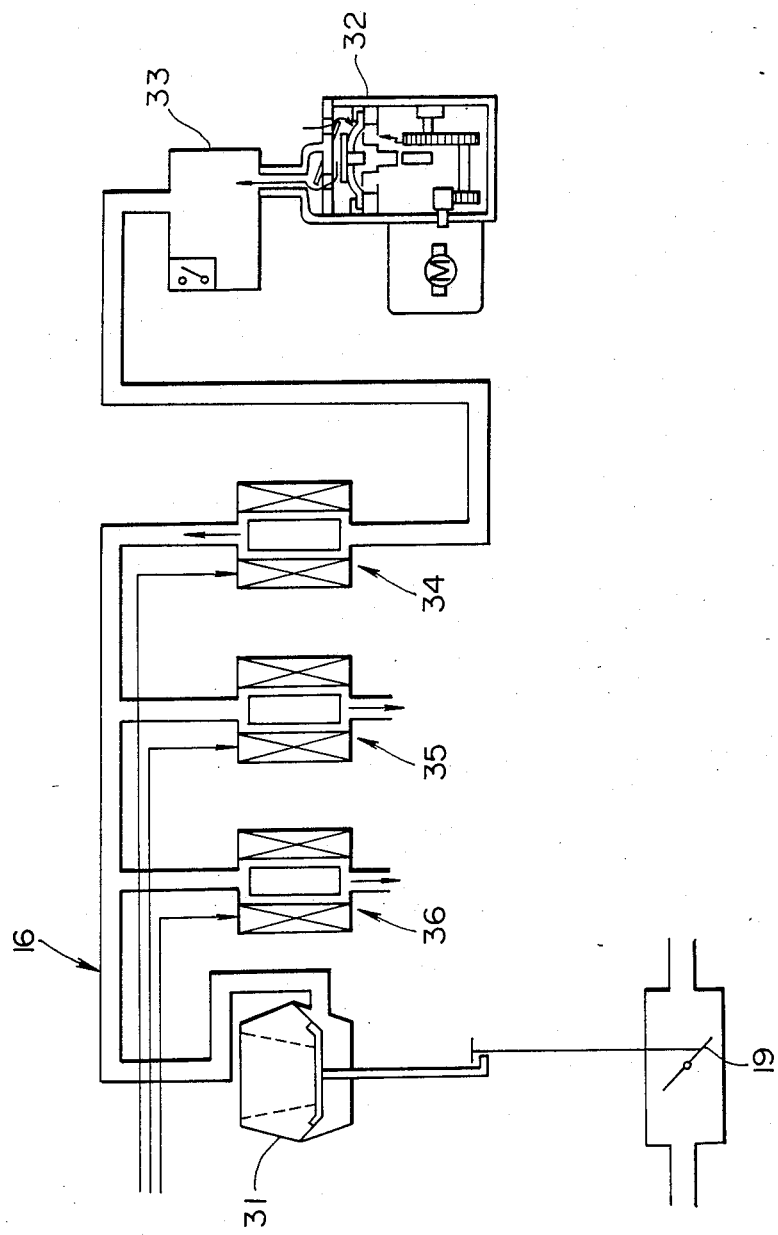
FIG. 2 is a simplified construction of a throttle actuator shown in FIG. 1.

The specific construction of throttle actuator 16 is shown in FIG. 2.

A diaphragm 31 is provided which is actuatable to the throttle valve 19. Pressurized air derived in an electrically operated air pump 32 is supplied from an air tank 33 to the diaphragm via the acceleration valve 34. A deceleration valve 35 and release valve 36 are installed at a downstream of the acceleration valve 34 for opening to the atmosphere. When the automatic cruising speed control is not carried out, the acceleration valve 34 is closed and deceleration valve 36 is opened so that an internal chamber of the diaphragm 31 is opened to the atmosphere and the diaphragm 31 is in an inoperative state. When the automatic cruising speed control is carried out, the release valve 36 is closed and the opening and closing of the acceleration valve 34 cause the pressure of air applied to the diaphragm 31 to be controlled.

Next, a control operation of the preferred embodiment shown FIGS. 1 and 2 by means of the control circuit will be described with reference to a processing flowchart shown in FIGS. 3(A) and 3(B).

Figure 3:
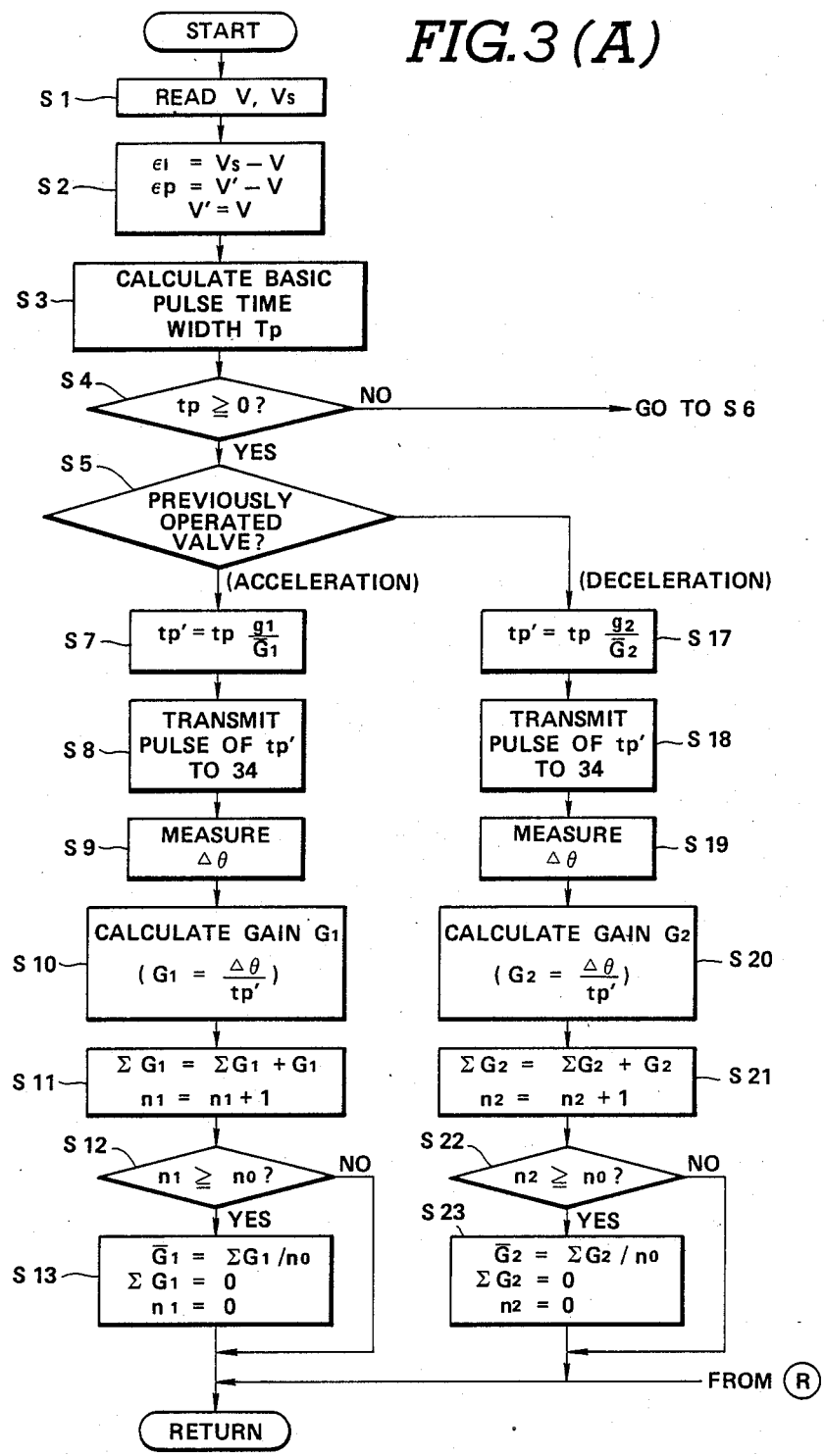
FIGS. 3(A) and 3(B) together illustrate a control processing routine executed in a control circuit shown in FIG. 1.
Figure 3B:
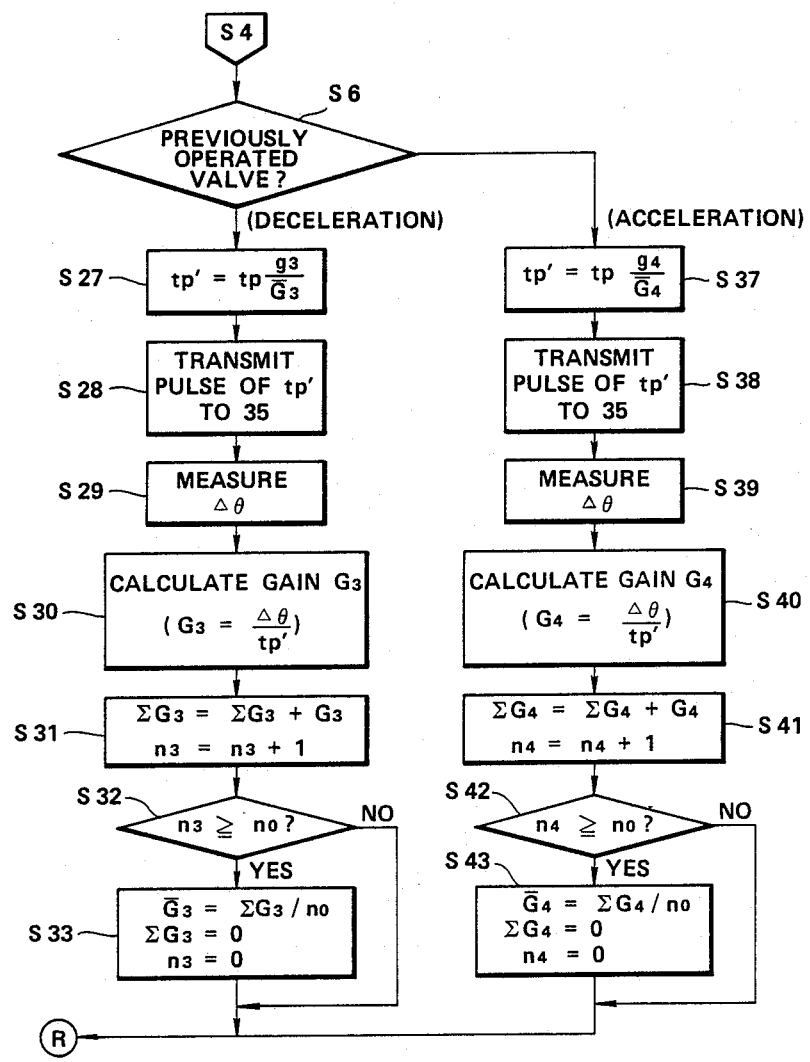

The processing routine shown in FIGS. 3(A) and 3(B) is executed for a predetermined control period (for example, 300 msec).

In a step S1, the CPU of the control circuit 15 reads the target vehicle speed Vs transmitted from the set switch 11 and vehicle speed V detected by the vehicle speed sensor. In a step S2, the CPU calculates a proportional error $\epsilon_p (= V'-V)$ as a deviation between the present vehicle speed V and vehicle speed V' before one control period and calculates an integral difference $\epsilon_I$ ($= Vs-V$) as a deviation between the target vehicle speed Vs and the vehicle speed V. In addition, the present vehicle speed V is set to V' for the calculation for the next calculation.

In a step S3, a basic pulse timewidth (basic manipulated variable) $t_p$ of an electric pulse during a pulse width of which the acceleration or deceleration valve 34 or 35 of the throttle actuator 16 is operated is calculated from the values of $\epsilon_I$ and $\epsilon_p$ derived in the step S2 using the following equation:

$$t_p = K_I \epsilon_I + K_p \epsilon_p$$

In a step S4, the CPU of the control circuit 15 determines whether the basic pulse timewidth $t_p$ is equal to or more than zero or not. If $t_p \geq 0$, i.e., the CPU determines that the acceleration valve 34 should be operated, the routine goes to the step S5. On the other hand, if $t_p < 0$, i.e., the deceleration valve 35 should be operated, the routine goes to a step S6.

The transfer function of the throttle actuator 16 and accelerator link are substantially the same. However, the transfer function becomes varied depending on whether either of the valves which has previously been operated is the same acceleration (or deceleration) valve or the different (acceleration or deceleration) valve although the same acceleration (or deceleration) valve is to be operated. This is because of hysteresis occurring in the accelerator link system.

In the steps S5 and S6, the CPU determines whether the previously operated valve is the acceleration valve 34 or deceleration valve 35 so that a generation mode of the output pulse signal is classified into modes (i) to (4) and the transfer function of each mode is independently calculated.

Figure 4:
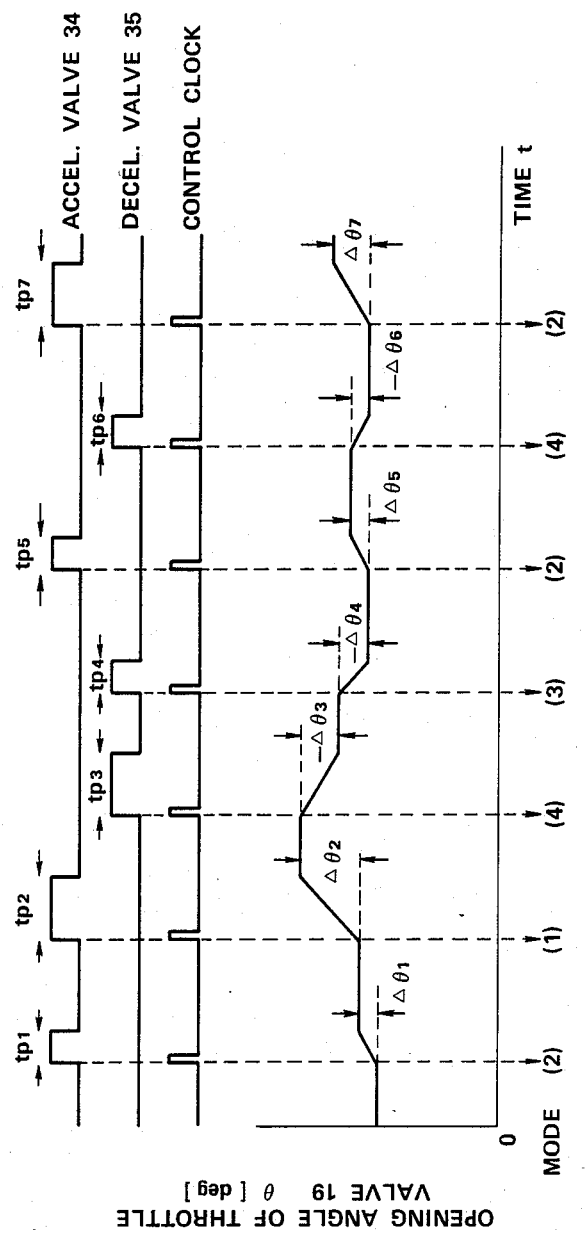
FIG. 4 is a timing chart representing various operating states in the system shown in FIG. 1.

For example, if the previously operated valve is the same acceleration valve 34 to be operated at this time in the step S5, the generation mode corresponds to the mode (1) shown in FIG. 4. In a step S7, the pulsewidth $t_{p'}$ of the electric pulse outputted to the acceleration valve 34 is corrected and set using the following equation:

$$t_{p'} = t_p \times g_1 / \overline{G}_1$$

In the above-expressed equation, $g_1$ denotes a basic gain for the basic pulsewidth $t_p$ and $\overline{G}_1$ denotes an average value $\overline{G}$ of a measured gain derived through the transfer function as described later.

In a step S8, the electric pulse $t_p$, whose pulsewidth is outputted to the acceleration valve 34.

In a step P9, an increment $\Delta\theta$ of the increased opening angle of the throttle valve 19 is calculated from the detected value of the throttle valve sensor 13.

In a step 10, a gain $G_1$ of the output variable $\Delta\theta 0$ for the manipulated variable $t_p$, of the operating signal is calculated as follows: $G_1 = \Delta\theta/t_p'$.

In steps 11 to 13, the measured gain average value $\overline{G}_i$ whenever the number of times the samplings $n_1$ are carried out reaches a predetermined value $n_0$ (for example, 500).

That is to say, a total sum $\Sigma G_1$ is updated by adding the present gain $G_1$ derived in the step S10 to the prior total sum $\Sigma G_1$ of the gain $G_1$ in the step S11.

In the step S11, the number of times the samplings $n_1$ are carried out are counted up.

In the step S12, the number of times of the sampling $n_1$ is compared with the predetermined value $n_o$. If $n_1$ reaches $n_o$, the average value $\overline{G}_1$ of the gain is calculated by subtracting the total sum $\Sigma G_1$ by $n_0$ and the total sum $\Sigma G_1$ and sampling number $n_1$ are reset to zero, respectively.

The average value $\overline{G}_1$ derived in this way is used in the processing of the step S7.

If the previously operated valve is determined to be the deceleration valve 35 as different in the present time in the step S5, the mode corresponds to the mode (2) of FIG. 5. If the previously operated valve is determined to be the deceleration valve 35 which is the same as that at the present time in the step S6, the mode corresponds to mode (3). If the previously operated valve is determined to be the different acceleration valve, the mode corresponds to the mode (4).

Hence, the pulsewidth $t_p$, of either the acceleration valve 34 or deceleration valve 35 is calculated and outputted to the corresponding valves on the basis of the measured gain average value $\overline{G}_2$, $\overline{G}_3$, and $\overline{G}_4$ and respectively different basic gains $g_2$, $g_3$, and $g_4$ in the modes (2) to (4) in the same way as in the mode (1). Then, the new calculations to derive the new average gains $\overline{G}_2$, $\overline{G}_3$, and $\overline{G}_4$ are carried out.

In the way described above, the gain average values $\overline{G}_1$ to $\overline{G}_4$ for the transfer function are measured to use them for the correction of the manipulated variable. Therefore, the variation of the frictional force during the stroke of the accelerator link 7 and variations due to their changes of temperature and aging effects in the response characteristics of the valves in the throttle actuator 16 occur, the favorable correction of the manipulated variable can be carried out to cope with such variations and changes. Consequently, a stable cruising speed control performance irrespective of different engines can always be maintained.

As described hereinabove, the system and method for automatically controlling the vehicle speed to the desired cruising speed according to the present invention, the manipulated variable of the throttle valve is corrected on the basis of the actually measured values of the transfer function. Therefore, the stable cruising speed controlling performance can always be maintained without influence of the dispersions of the accelerator link and throttle actuator of the vehicle on which the system is mounted.

It will be appreciated by those skilled in the art that the foregoing description is made in terms of the preferred embodiment and various changes and modifications may be made without departing from the scope of the invention which is to be defined by the appended claims.

What is claimed is:

1. A system for automatically controlling a vehicle speed to a desired cruising speed, comprising:
   (a) first means for measuring the vehicle speed;
   (b) second means for setting the vehicle speed to the desired target cruising speed according to a driver's intention;
   (c) third means for controlling an engine input variable which is correlated to an engine output of a vehicle in which the system is mounted on the basis of a manipulated variable so that the vehicle speed coincides with the target cruising speed;
   (d) fourth means for calculating a basic manipulated variable on the basis of the measured vehicle speed and desired target cruising speed set by said second means;
   (e) fifth means for measuring the input variable of the engine output;
   (f) sixth means for calculating a transfer function of a response of the engine input variable to a change in the manipulated variable; and
   (g) seventh means for correcting the basic manipulated variable on the basis of the transfer function calculated by the sixth means and setting and outputting the corrected manipulated variable to the third means.

2. A system for automatically controlling a vehicle speed to a desired cruising speed, comprising:
   (a) first means for measuring the vehicle speed;
   (b) second means for setting the vehicle speed to the desired target cruising speed according to a driver's intention;
   (c) third means for controlling an opening angle of a throttle valve of an engine of a vehicle in which the system is mounted on the basis of a manipulated variable so that the vehicle speed coincides with the target cruising speed;
   (d) fourth means for calculating a basic manipulated variable on the basis of the measured vehicle speed and desired target cruising speed set by said second means;
   (e) fifth means for measuring the opening angle of the throttle valve;
   (f) sixth means for calculating a transfer function of a response of the opening angle of the throttle valve measured by the fifth means to a change in the manipulated variable; and
   (g) seventh means for correcting the basic manipulated variable on the basis of the transfer function calculated by the sixth means and setting and outputting the corrected manipulated variable to the third means.

3. A system as set forth in claim 2, wherein the third means includes a pneumatic actuator linked to the throttle valve via an accelerator link which actuates the throttle valve in an open direction according to air pressure supplied to the actuator for a first duration, the first duration being defined by an opening duration of a first valve for supplying pressurized air to the actuator and actuates the throttle valve in a close direction according to the atmosphere supplied to the actuator for a second duration, the first and second durations being determined by a timewidth of a signal corresponding to the corrected manipulated variable set and outputted by the seventh means.

4. A system as set forth in claim 3, wherein the timewidth of the signal corresponding to the manipulated variable determines either of the first or second duration depending on which of the first and second valves has previously operated and using the following equation: $t_p' = t_p \times g_i / \overline{G}i$, wherein $t_p'$ denotes the timewidth, $t_p$ denotes a basic timewidth corresponding to the basic manipulated variable, $g_i$ denotes a basic gain of the basic manipulated variable with respect to the change of the opening angle of the throttle valve, $\overline{G}_i$ denotes an average gain of the manipulated variable with respect to the change of the opening angle of the throttle valve measured by the fifth means, and i denotes a numeral of any one of 1 to 4 determined on the basis of either of which of the first and second valves has previously been operated.

5. A system as set forth in claim 4, wherein i denotes 1 determined when the previously operated valve is the first valve and the presently operated valve is the first valve, i denotes 2 determined when the previously operated valve is the second valve and presently operated valve is the first valve, i denotes 3 determined when the previously operated valve is the first valve and presently operated valve is the second valve, and i denotes 4 determined when the previously operated valve is the second valve and presently operated valve is the second valve.

6. A system as set forth in claim 5, wherein $\overline{G}_i = \Sigma G_i / n_o$, wherein $n_o$ denotes a predetermined number of samplings to derive the total gain of $\Sigma G_i$.

7. A system as set forth in claim 4, wherein the basic manipulated variable $t_p$ is expressed as follows: $t_p = K_I \times \epsilon_I + K_p \times \epsilon_p$, wherein $K_I$ and $K_p$ denote control gain constants, $\epsilon_I$ denotes an integral error between the vehicle speed and target cruising speed, and $\epsilon_p$ denotes a proportional error between the present vehicle speed and vehicle speed during a predetermined control period.

8. A method for automatically controlling a vehicle speed to a desired cruising speed, comprising the steps of:
(a) measuring the vehicle speed;
(b) setting the vehicle speed to the desired cruising speed according to a driver's intention;
(c) calculating a basic manipulated variable on the basis of the measured vehicle speed and desired cruising speed set by said second means;
(d) measuring an opening angle of a throttle valve of an engine of a vehicle;
(e) calculating a transfer function of a response of an opening angle of the throttle valve to a change in a manipulated variable;
(f) correcting the basic manipulated variable calculated in the step (d) on the basis of the calculated transfer function and setting and outputting the corrected manipulated variable; and
(g) controlling the opening angle of the throttle valve on the basis of the corrected manipulated variable set and outputted in the step (f) so that the vehicle speed coincides with the desired target cruising speed.

* * * * *